United States Patent [19]
Cherbettchian et al.

[11] Patent Number: 5,748,565
[45] Date of Patent: *May 5, 1998

[54] FLEXIBLE INTERLINK FOR HYDROPHONE ARRAY

[75] Inventors: Agop H. Cherbettchian, Santa Monica; William P. Debley, Northridge, both of Calif.

[73] Assignee: Litton Systems, Inc., Woodland Hills, Calif.

Related U.S. Application Data

[60] Provisional application No. 60/026,771, Sep. 26, 1996.

[21] Appl. No.: 859,435

[22] Filed: May 20, 1997

[51] Int. Cl.⁶ .................................................. H04R 1/44
[52] U.S. Cl. ........................................ 367/154; 367/173
[58] Field of Search ................................. 367/154, 173, 367/165, 149

[56] References Cited

U.S. PATENT DOCUMENTS

| | | |
|---|---|---|
| 4,351,036 | 9/1982 | Mollere ................................. 367/154 |
| 5,317,544 | 5/1994 | Maas et al. .......................... 367/149 |

*Primary Examiner*—Daniel T. Pihulic
*Attorney, Agent, or Firm*—Elliott N. Kramsky

[57] ABSTRACT

A flexible interlink for joining a first sensor of the type that includes a cylindrical mandrel for mounting a common optical fiber to a second sensor of a hydrophone that includes a cylindrical mandrel for mounting said fiber. The interlink includes an integral molded body of flexible material. Enlarged diameter ends are joined to the link by outwardly-tapered transition members. Resilient metal washers are fixed to the ends for locking onto the sensor. The washer includes radial elements that abut corresponding radial elements of the end. The radial elements of the washer are outwardly inclined, of greater length than the corresponding radial elements of the end and exceed the inner diameter of the sensor from tip to tip.

22 Claims, 2 Drawing Sheets

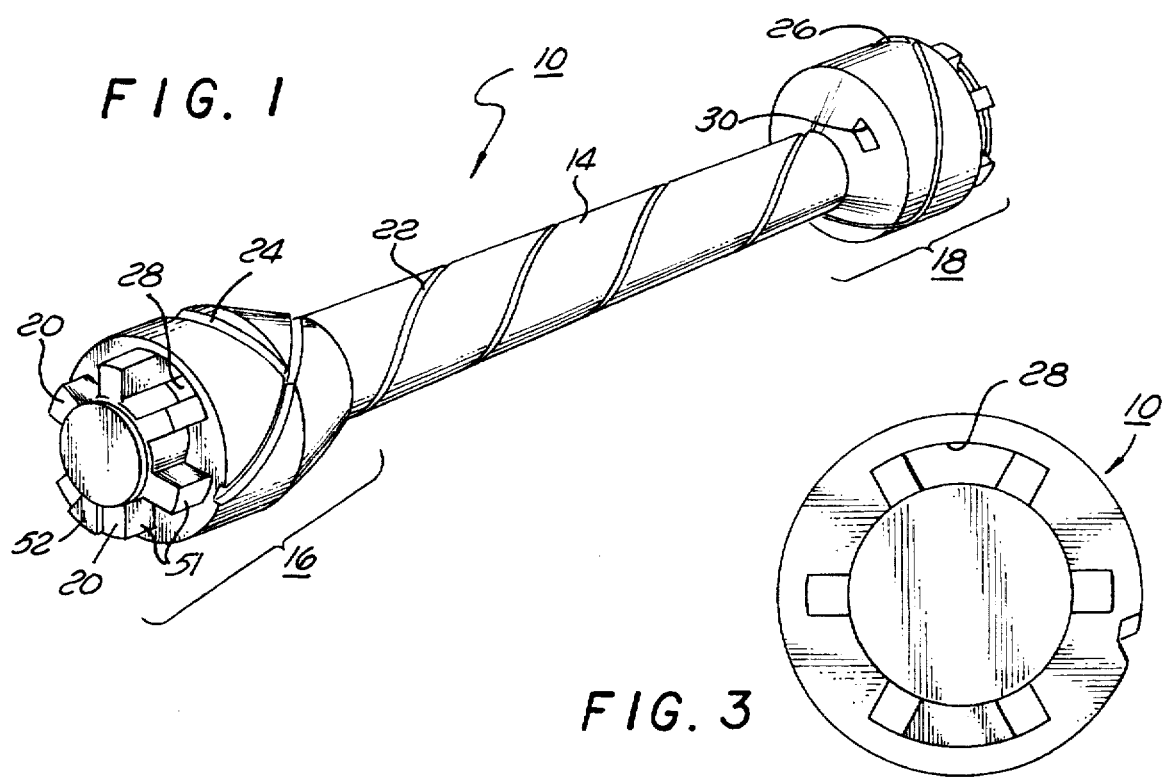

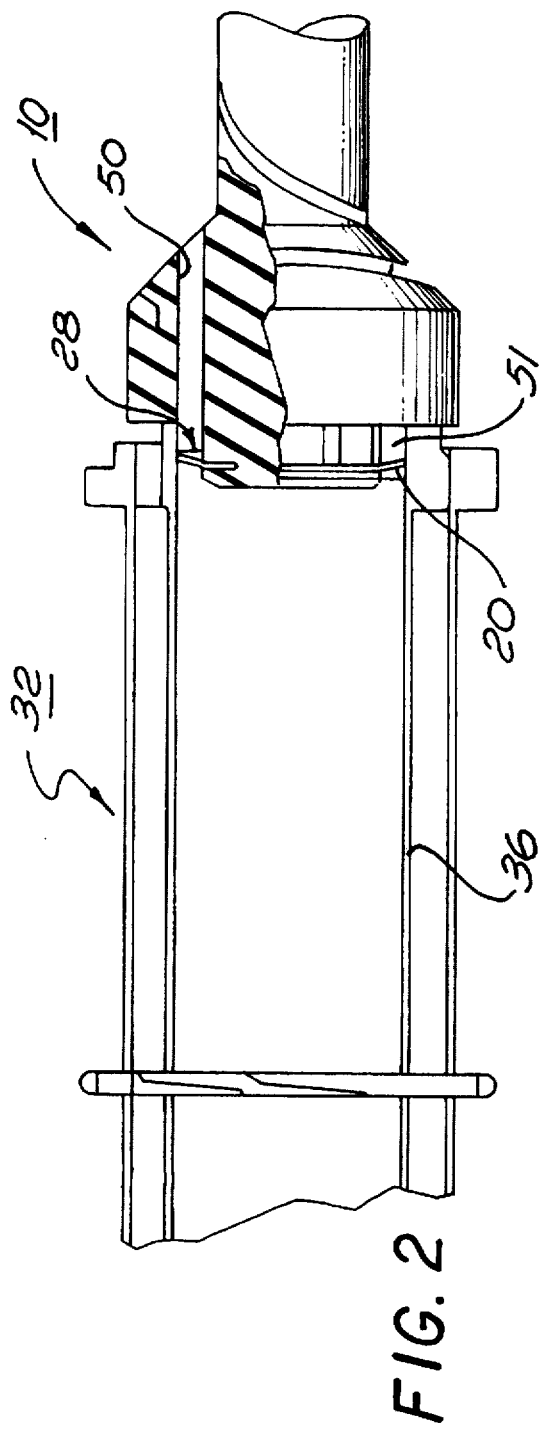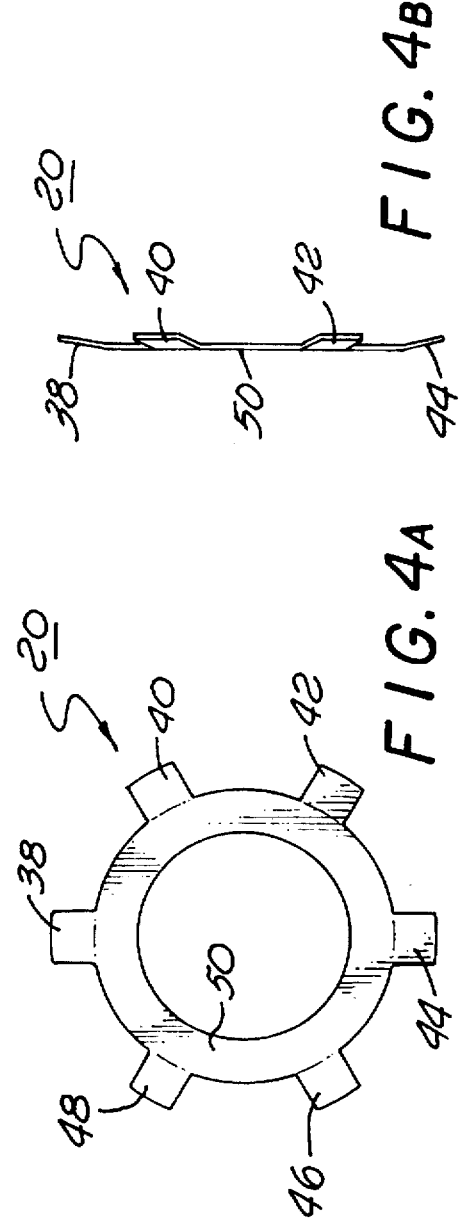

FLEXIBLE INTERLINK FOR HYDROPHONE ARRAY

BACKGROUND

1. Reference to Related Application

The present application claims priority under 35 U.S.C. 119 from provisional patent application Ser. No. 60/026,771 of inventors Agop H. Cherbettchian and William P. Debley titled "Flexible Interlink For Hydrophone Array" filed Sep. 26, 1996.

2. Field of the Invention

The present invention relates to apparatus for conjoining and aligning a plurality of sensors of a hydrophone. More particularly, this invention pertains to such apparatus for use with sensors of the type that include a generally-tubular elongated mandrel.

3. Description of the Prior Art

One type of fiber optic hydrophone consists of a plurality of tubular sensors, each including coaxial inner and outer mandrels with the inner mandrel serving as the reference mandrel and the coaxial outer mandrel serving and the sensing mandrel. Such an arrangement is taught, for example, in U.S. Pat. No. 5,317,544 of Maas et al. entitled "Multiple Segment Fiber Optic Hydrophone."

The sensors of such a hydrophone are interconnected whereby a single fiber is commonly wound upon the sensing mandrel of each sensor and a second fiber is commonly wound upon the reference mandrel of each sensor. In this way, the hydrophone, comprising a plurality of sensors arranged end-to-end and held within an elongated rubber hose, attains heightened sensitivity.

It is necessary to provide a means for interconnecting, and maintaining a fixed and predetermined distance between adjacent sensors. Otherwise, the fine optical fibers would be subject to breakage; further, the distance between sensors determines detection frequency, a critical parameter of the device. As the hydrophone is stored aboard ship coiled upon a spool and played out when in operation, the arrangement must be flexible.

In the past, flexible interconnections between hydrophone sensors of the above-described type has been provided by means of aluminum rods. Such rods have been joined to the inner mandrels of adjacent sensors by means of a relatively-complex mechanical arrangement that includes, at each of the rod (machined to include knurled opposed ends), an adapter piece of hard rubber (dimensioned to fit securely within the inner mandrel and including a pin-like knurled end), a sleeve-like rubber elbow and a pair of crimping rings for securing the opposed ends of the rubber elbow to the knurled ends of the rod and the adapter. Since the separation distance between sensors determines the frequency sensitivity of the hydrophone, relatively close spacing of sensors may be dictated that require a corresponding multiplicity of connections, each of which requires numerous individual parts, as described above.

In addition to the need to manufacture and assemble numerous individual parts, the prior art technique is further hindered by costly and time-consuming machining steps in regard to the fabrication of the aluminum rods and costly assembly due to the need to perform many labor-intensive crimping processes. Further, despite the use of crimping, affixation of assemblies to sensors requires gluing and the attendant setting time. This eliminates the possibility of automation of the process of assembly of a hydrophone comprising a plurality of sensors.

SUMMARY OF THE INVENTION

The preceding and other shortcomings of the prior art are addressed by the present invention which provides, in a first aspect, apparatus for connecting a first sensor of the type that includes at least one cylindrical mandrel to a second sensor of the type that also includes at least one cylindrical mandrel with a common optical fiber being wound upon such mandrels. Such apparatus includes a flexible elongated member. Means are provided at the ends of the member for engaging such sensor. Each of the means for engaging includes means for locking onto a sensor.

In a second aspect, the invention provides a hydrophone. Such hydrophone includes a plurality of sensors, each of which includes at least one cylindrical mandrel. Such sensors are aligned within a flexible hollow casing. Means is provided for connecting adjacent sensors. Such means includes a flexible elongated member with means for engaging a sensor being located at each end of the member. Each means for engaging includes means for locking onto a sensor.

The foregoing and other features and advantages of this invention will become further apparent from the detailed description that follows. Such description is accompanied by a set of drawing figures. Numerals of the drawing figures, corresponding to those of the written description, point to the various features of the invention with like numerals referring to like features throughout both the written description and the drawing figures.

BRIEF DESCRIPTION OF THE DRAWINGS

FIG. 1 is a perspective view of a hydrophone interlink in accordance with the invention;

FIG. 2 is a cross-sectional view of an interlink in accordance with the invention joined at one end to a hydrophone;

FIG. 3 is a front elevation view of the an end flange of an interlink in accordance with the invention; and FIGS. 4(a) and 4(b) are front elevation and side views, respectively, of a retainer washer in accordance with the invention.

DETAILED DESCRIPTION

FIG. 1 is a perspective view of a hydrophone interlink 10 in accordance with the invention. The interlink 10 comprises a molded body portion generally including an elongated central member 14 that terminates in end flange assemblies 16, 18 of enlarged diameter and end-mounted retainer washer(s) 20 (washer at opposite end not shown).

The metallic retainer washer(s) 20 is (are) affixed to the flange(s) of the molded body during the injection molding process. The body is preferably formed of an injection-moldable thermoplastic rubber such as that commercially available under the trademark "SANTOPRENE" from Monsanto Corporation. A hardness value of 90 A measured by durometer is appropriate.

As can be seen, a main helical groove 22 runs substantially along the length of the interlink 10, generally spanning both the central member 14 and the end flanges 16 and 18. Helical grooves 24 and 26 of opposite sense to that of the major helical groove 22, each comprising about one-half turn of the circumference of the end flanges 16 and 18 respectively, are provided for the reversal of direction of fiber emerging from an adjacent downstream hydrophone. Such a situation may be encountered in the event that an even number of layers of windings are employed in a downstream hydrophone to satisfy accuracy requirements. Although emerging from the "wrong" end of such a hydrophone, the optical fiber may be guidedly reversed in a gradual manner by traversing one of the grooves 24 or 26 to then enter and be routed downstream by the main groove 18 without introduction of a harmful extreme or abrupt bend into the signal transmitting optical fiber. The tapered inner surfaces of the end flanges further facilitate gradual transitioning of the optical fiber.

An aperture 28 marks the outer termination an internal channel through the end flange 16 while an aperture 30 marks the inner termination of a like channel through the end flange 18. Such channels are provided for post-interlink affixation injection of EPOXY or other deadening material within the internal reference mandrel of a conjoined hydrophone comprising coaxial cylindrical mandrels such as that taught, for example, in U.S. Pat. No. 5,317,544 of Maas et al. entitled "Multiple Segment Fiber Optic Hydrophone".

FIG. 2 is a cross-sectional view of an end of the interlink 10 as engaged to the mating end of a hydrophone 32. As can be seen, the end flange 16 is abuttably press-fit to the end 34 of the hydrophone 32. The washer 20, whose major diameters, spanning opposed radial fingers, exceed the inner diameter of an interior or reference mandrel 36, grips the interior of the inner mandrel 36 at its radial extrema and is spring-loaded thereagainst as a consequence of a number of design features. Referring to FIG. 2 in combination with FIGS. 4A and 4B, front elevation and side views of the representative retainer washer 20, one can see that the fingers 38 through 48 that radiate from an interior ring 50 of the washer are forwardly-inclined. Further, as they abut the resilient material of the end flange 16 and span radial distances somewhat greater (e.g. 0.576" dia of washer vs. 0.565" dia of molded fingers and 0.568" inner diameter of internal mandrel of hydrophone) than both the supporting fingers 51 of the molded body of the interlink and the inner diameter of the interior mandrel 36 and are formed of spring steel (preferably tempered black oxide steel), a reactive retaining force is generated that acts against the interior of the inner mandrel 36 after insertion of the interlink 10 to accomplish the press-fit illustrated in FIG. 2. Such factors, as well as the tendency of the spring steel washer to straighten (encouraged by the resilience of the molded fingers 50 (see FIG. 1) cause the fingers of the washer 20 to dig into the inner surface of the interior mandrel 36, preventing disassociation of the interlink 10 from the hydrophone 32 in response to axial tension therebetween.

As seen in FIG. 3, a front elevation view of the interlink 10, in combination with the perspective view of FIG. 1, a key 52 is formed within the molded end flange 16. The key protrudes beyond the molded fingers 51 of the end flange and, thus, beyond the location of the washer 20 to prevent rotation of the washer 20 about the longitudinal axis of the interlink.

While this invention has been described with reference to its presently-preferred embodiment, it is not limited thereto. Rather, this invention is limited only insofar as it is described by the following set of patent claims and includes within its scope all equivalents thereof.

What is claimed is:

1. Apparatus for connecting a first sensor of the type that includes at least one cylindrical mandrel to a second sensor of the type that includes at least one cylindrical mandrel with a common optical fiber wound upon each of said mandrels, said apparatus comprising, in combination:

a) a flexible elongated member;

b) means for engaging a sensor located at each end of said member; and c) said means including means for locking.

2. Apparatus as recited in claim 1 wherein said means for locking comprises a resilient metal washer.

3. Apparatus as recited in claim 2 wherein said washer includes a plurality of radially-directed fingers.

4. Apparatus as recited in claim 3 wherein each of said radially-directed fingers is radially outwardly-inclined.

5. Apparatus as recited in claim 4 wherein said means for engaging includes:

a) an enlarged diameter end member, said end member being integral with said elongated member; and b) a tapered transition member integral with and intermediate said elongated member and said end member.

6. Apparatus as recited in claim 5 further including a continuous spiral groove extending over the surfaces of said elongated member, said end members and said transition members for receiving said common optical fiber.

7. Apparatus as defined in claim 6 including a spiral groove segment of reverse sense extending over the surfaces of each of said end members and intersecting with said continuous spiral groove.

8. Apparatus as defined in claim 1 comprising molded thermoplastic rubber.

9. Apparatus as defined in claim 7 further including an axially-directed aperture extending through each of said end and transition members.

10. Apparatus as recited in claim 5 further including:

a) each of said end members having a substantially-planar surface;

b) said washer being fixed to said substantially-planar surface of said end member;

c) said substantially-planar surface including a plurality of radially-directed sections; and d) each of said radially-directed sections being aligned with a radially-directed finger of said washer.

11. Apparatus as recited in claim 10 wherein said end member further includes:

a) an axially-directed key; and b) said key is fixed to said end member; and c) said key being located between and extending beyond a pair of said radially-directed sections.

12. A hydrophone comprising, in combination:

a) a plurality of sensors, each of said sensors including at least one cylindrical mandrel;

b) a flexible hollow casing;

c) said plurality of sensors being contained in aligned relationship within said hollow casing;

d) means for connecting adjacent sensors;

e) said means comprising a flexible elongated link;

f) means for engaging to a sensor being located at each end of said member; and g) said means for engaging including means for locking.

13. A hydrophone as recited in claim 12 wherein said means for locking comprises a resilient metal washer.

14. A hydrophone as recited in claim 13 wherein said washer includes a plurality of radially-directed fingers.

15. A hydrophone as recited in claim 14 wherein each of said radially-directed fingers is radially outwardly-inclined.

16. A hydrophone as recited in claim 15 wherein said means for engaging includes:

a) an enlarged diameter end member, said end member being integral with said elongated member; and b) a tapered transition member integral with and intermediate said elongated member and said end member.

17. A hydrophone as recited in claim 16 further including a continuous spiral groove extending over the surfaces of said elongated member, said end members and said transition members for receiving said common optical fiber.

18. A hydrophone as defined in claim 17 including a spiral groove segment of reverse sense extending over the surfaces of each of said end members nd intersecting with said continuous spiral groove.

19. A hydrophone as defined in claim 12 comprising molded thermoplastic rubber.

20. A hydrophone as defined in claim 18 further including an axially-directed aperture extending through each of said end and transition members.

21. A hydrophone as recited in claim 16 further including:
a) each of said end members having a substantially-planar surface;
b) said washer being fixed to said substantially-planar surface of said end member;
c) said substantially-planar surface including a plurality of radially-directed sections; and
d) each of said radially-directed sections being aligned with a radially-directed finger of said washer.

22. Apparatus as recited in claim 21 wherein said end member further includes:
a) an axially-directed key; and
b) said key is fixed to said end member; and
c) said key being located between and extending beyond a pair of said radially-directed sections.

* * * * *